US010359949B2

(12) United States Patent
Seroff et al.

(10) Patent No.: US 10,359,949 B2
(45) Date of Patent: Jul. 23, 2019

(54) SYSTEMS AND METHODS FOR OBTAINING AND USING NONVOLATILE MEMORY HEALTH INFORMATION

(75) Inventors: Nicholas Seroff, Los Gatos, CA (US); Anthony Fai, Palo Alto, CA (US); Nir Jacob Wakrat, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 1598 days.

(21) Appl. No.: 13/285,145

(22) Filed: Oct. 31, 2011

(65) Prior Publication Data

US 2013/0111298 A1 May 2, 2013

(51) Int. Cl.
G11C 29/00 (2006.01)
G06F 3/06 (2006.01)
G06F 11/30 (2006.01)
G06F 11/34 (2006.01)

(52) U.S. Cl.
CPC ............ *G06F 3/0614* (2013.01); *G06F 3/064* (2013.01); *G06F 3/0679* (2013.01); *G06F 11/3034* (2013.01); *G06F 11/3055* (2013.01); *G06F 11/3409* (2013.01); *G06F 11/3485* (2013.01)

(58) Field of Classification Search
CPC ............ G06F 11/1076; G06F 11/1008; G06F 11/1068; G06F 11/1044; G06F 3/0614; G06F 11/3055; G06F 11/3034; G06F 3/0679; G06F 3/064; G06F 11/3409; G06F 11/3485; H05K 999/99
USPC ......................................................... 714/763
See application file for complete search history.

(56) References Cited

U.S. PATENT DOCUMENTS

| 5,127,014 A | * | 6/1992 | Raynham | G06F 11/1076 365/200 |
| 5,353,256 A | * | 10/1994 | Fandrich | G06F 12/1425 365/185.11 |
| 5,452,418 A | * | 9/1995 | Tatosian | G06F 11/1008 711/117 |

(Continued)

FOREIGN PATENT DOCUMENTS

JP 2008198310 8/2008

OTHER PUBLICATIONS

International Preliminary Report on Patentability from PCT/US2012/056809, dated May 15, 2014, Apple Inc., pp. 1-8.

(Continued)

*Primary Examiner* — Samir W Rizk
*Assistant Examiner* — Enam Ahmed
(74) *Attorney, Agent, or Firm* — Meyertons, Hood, Kivlin, Kowert & Goetzel, P.C.

(57) ABSTRACT

Systems and methods are provided for obtaining and using nonvolatile memory ("NVM") health information. Health information can include a variety of information associated with the performance and reliability of portions of an NVM device, such as the number of errors detected in a portion of NVM or the amount of time required to read from or program a portion of nonvolatile memory. During operation, address specific health information may be stored passively on a host device and provided as part of a command to a memory controller. The memory controller may extract the health information from the command and use the information to execute access requests. After an access request is completed, the memory controller can update the health information and transmit the information back to the host device.

20 Claims, 4 Drawing Sheets

(56) References Cited

U.S. PATENT DOCUMENTS

| | | | | |
|---|---|---|---|---|
| 5,488,691 | A * | 1/1996 | Fuoco | G06F 11/1056 714/5.11 |
| 5,517,626 | A * | 5/1996 | Archer | G06F 13/4217 710/105 |
| 5,737,744 | A * | 4/1998 | Callison | G06F 11/1076 711/114 |
| 5,781,918 | A * | 7/1998 | Lieberman | G06F 11/1016 710/66 |
| 7,653,778 | B2 * | 1/2010 | Merry, Jr. | G06F 12/0246 711/103 |
| 7,805,511 | B1 | 9/2010 | Panicker | |
| 8,255,006 | B1 * | 8/2012 | Chavez | H04M 1/72569 379/207.09 |
| 8,621,266 | B2 * | 12/2013 | Kang | G06F 11/1068 714/6.1 |
| 8,706,932 | B1 * | 4/2014 | Kanapathippillai | G06F 13/1657 710/62 |
| 2001/0026472 | A1 * | 10/2001 | Harari | G06F 3/0601 365/185.03 |
| 2002/0116544 | A1 * | 8/2002 | Barnard | H04L 12/2805 719/324 |
| 2005/0210304 | A1 * | 9/2005 | Hartung | G06F 1/3268 713/320 |
| 2005/0243610 | A1 * | 11/2005 | Guha et al. | 365/189.05 |
| 2007/0094445 | A1 * | 4/2007 | Trika | G06F 3/0616 711/113 |
| 2007/0180328 | A1 | 8/2007 | Cornwell et al. | |
| 2007/0198786 | A1 | 8/2007 | Bychkov et al. | |
| 2007/0214314 | A1 * | 9/2007 | Reuter | 711/114 |
| 2007/0260811 | A1 | 11/2007 | Merry, Jr. et al. | |
| 2008/0320209 | A1 * | 12/2008 | Lee | G06F 12/0246 711/103 |
| 2009/0070654 | A1 * | 3/2009 | Flachs | G06F 11/1044 714/758 |
| 2009/0158124 | A1 * | 6/2009 | Kawai | G06F 3/0614 714/763 |
| 2009/0182962 | A1 | 7/2009 | Khmelnitsky et al. | |
| 2010/0064096 | A1 * | 3/2010 | Weingarten | G06F 12/0246 711/103 |
| 2010/0115726 | A1 | 5/2010 | Groff et al. | |
| 2010/0218072 | A1 * | 8/2010 | Fukuyama | G06F 11/1048 714/763 |
| 2010/0250836 | A1 | 9/2010 | Sokolov et al. | |
| 2010/0251039 | A1 | 9/2010 | Hirohata et al. | |
| 2011/0008536 | A1 | 1/2011 | Oh | |
| 2011/0252289 | A1 * | 10/2011 | Patapoutian | G06F 11/1048 714/763 |
| 2012/0239413 | A1 * | 9/2012 | Mathur | G06Q 10/06 705/2 |
| 2012/0239991 | A1 * | 9/2012 | Melik-Martirosian | G06F 11/3034 714/708 |
| 2013/0117036 | A1 * | 5/2013 | Cothren | G06F 19/30 705/2 |
| 2014/0192583 | A1 * | 7/2014 | Rajan | G11C 7/10 365/63 |

OTHER PUBLICATIONS

Office Action from Japanese Application No. 2012230293, dated Jan. 5, 2015, English version, pp. 1-7.
Office Action from European Patent Application No. A127452EP, dated Jul. 26, 2013, pp. 1-7.
International Search Report and Written Opinion in Application No. PCT/US2012/056809, dated Nov. 26, 2012, pp. 1-10.
Office Action from Japanese Application No. 2012-230293, dated Jan. 8, 2014, English and Japanese versions, pp. 1-10.
Office Action from Chinese Application No. 201210504255.2, issued Feb. 4, 2015, English and Chinese versions, pp. 1-44.
Office Action from Taiwanese Application No. 101136079, dated Mar. 5, 2015, English and Chinese versions, pp. 1-12.
Office Action, Chinese Application No. 201210504255.2, dated Sep. 11, 2015, 16 pages.
Office Action, Chinese Application No. 201210504255.2, dated Mar. 21, 2016, 18 pages.

* cited by examiner

SYSTEMS AND METHODS FOR OBTAINING AND USING NONVOLATILE MEMORY HEALTH INFORMATION

FIELD OF THE INVENTION

This document relates to systems and methods for obtaining and using nonvolatile memory health information.

BACKGROUND

Various types of nonvolatile memory ("NVM"), such as flash memory (e.g., NAND flash memory and NOR flash memory), can be used for mass storage. For example, consumer electronics (e.g., portable media players) use flash memory to store data, including music, videos, images, and other media or types of information.

In some flash memory systems, a host system requests read and program operations for logical block addresses (LBAs), which are mapped or translated to physical block addresses of flash memory. This mapping allows the host operating system to access flash memory in a manner similar to a disk drive. Although flash memory can be read or programmed a byte or word at a time in a random access fashion, it is usually erased a block at a time. Starting with a freshly erased block, any byte within that block can be programmed. Once a byte has been programmed, it typically cannot be reprogrammed until the entire block is erased. Since flash memory has a finite number of erase-program cycles it is desirable to minimize the number of erase-program cycles to prolong the life of the flash memory.

Due to the unique characteristics of flash memory described above, there is a need for systems, methods, and devices that can efficiently obtain and use health information of flash memory and other NVMs.

SUMMARY

Systems and methods for obtaining and using non-volatile memory ("NVM") health information are disclosed. Embodiments of this invention can operate in a system having a host and a non-volatile memory package. The host can include volatile memory and run non-volatile memory functions such as maintaining logical-to-physical mappings, issuing program, read, or erase commands to the NVM package, and performing wear leveling and garbage collection operations. The host can also maintain a health database according to embodiments of the invention. The NVM package is commutatively coupled to the host and can include a memory controller and non-volatile memory (e.g., Nand flash). In some embodiments, the NVM package can also include an error correction code engine.

The health database can store information related to the NVM. That is, for each physical location (e.g., page or block) in the NVM, health information specific to that physical location is stored in the database. The health information stored in the database may be address specific health information that specifies various software and/or hardware parameters used for accessing the NVM at that specific address location. The health information may include, for example, page correctness, threshold voltage, the time and/or number of cycles required to read, program, or erase, the error correction code used, etc. The health information may be generated by the memory controller but is stored in the database maintained by the host. Although the health information can be stored on the host, the host does not interpret, modify, or use the health information in any way to manage the NVM.

When the host wishes to access the NVM, it can assemble a command packet including an access command (e.g., a read or program command), an address, and address specific health information, and provide that command packet to the memory controller. The host accesses the health information database to retrieve address specific health information based on the address for inclusion to the command packet. When the memory controller receives the command packet, it can extract the health information and execute the access request according to the software and/or hardware parameters specified for the physical location being accessed in the NVM.

After the command is executed, the memory controller can then determine whether a change was required in one or more of the operation parameters in order to execute the access request. If a change was required, the memory controller can update the health information and transmit the updated health information and NVM address to the host device. The host can then store the updated health information it the database.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which.

DETAILED DESCRIPTION

Figure 1:
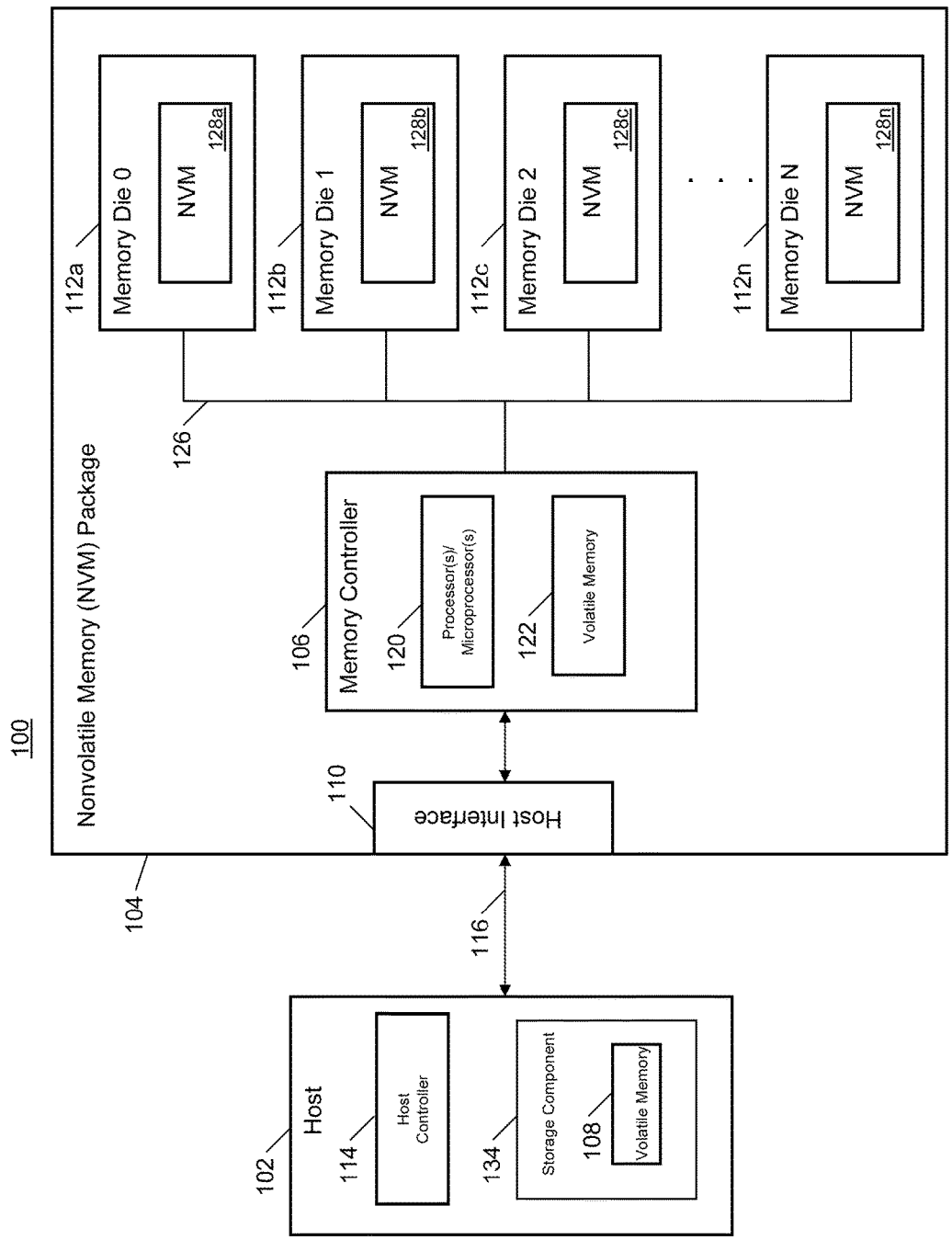
FIG. 1 is a diagram depicting an illustrative system that includes a host and an NVM package with a memory controller in accordance with various embodiments of the invention.

FIG. 1 is a diagram depicting system 100, including NVM package 104 and host 102. Host 102 may be configured to provide health information to NVM package 104, which can include memory controller 106, host interface 110, and memory dies 112a-n with corresponding NVMs 128a-n. For instance, as depicted in the example system 100, host 102 can provide health information to NVM package 104, which can use health information to perform access requests (e.g., read, program, and erase operations) and memory management functions (e.g., wear leveling and garbage collection) that can improve performance, reliability, and/or power usage of system 100. NVM package 104 may also update the health information and transfer it back to host 102 for storage in a health information database.

Host 102 can be any of a variety of host devices and/or systems, such as a portable media player, a cellular telephone, a pocket-sized personal computer, a personal digital assistant ("PDA"), a desktop computer, a laptop computer, and/or a tablet computing device. NVM package 104 can include NVMs 128a-n (e.g., in the memory dies 112a-n) and can be a ball grid array package or other suitable type of integrated circuit ("IC") package. NVM package 104 can be part of and/or separate from host 102. For example, host 102 can be a board-level device and NVM package 104 can be a memory subsystem that is installed on the board-level device. In other embodiments, NVM package 104 can be coupled to host 102 with a wired (e.g., SATA) or wireless (e.g., Bluetooth™) interface.

Host 102 can include host controller 114 that is configured to interact with NVM package 104. For example, host 102 can transmit various access requests, such as read, program, and erase operations, to NVM package 104. Host controller 114 can include one or more processors and/or microprocessors that are configured to perform operations based on the execution of software and/or firmware instructions. Additionally and/or alternatively, host controller 114 can include hardware-based components, such as application-specific integrated circuits ("ASICs"), that are configured to perform various operations. Host controller 114 can format information (e.g., commands, data) transmitted to NVM package 104 according to a communications protocol shared between host 102 and NVM package 104.

Host 102 can include storage component 134, including volatile memory 108. Volatile memory 108 can be any of a variety of volatile memory types, such as cache memory or RAM. Host 102 can use volatile memory 108 to perform memory operations and/or to temporarily store data that is being read from and/or written to NVM package 104. For example, volatile memory 108 can temporarily store a queue of memory operations to be sent to, or to store data received from, NVM package 104. In addition, volatile memory 108 can store a health information database according to embodiments of the invention. Host controller 114 can access the health information database to retrieve address specific health information for inclusion into commands issued to memory controller 106. Maintaining the health information database in volatile memory on host 102, as opposed to volatile memory on NVM package 104 is generally necessary because sufficient quantity of volatile memory is too expensive to keep in NVM package 104.

Host 102 can communicate with NVM package 104 over communications channel 116 using host interface 110 and memory controller 106. Communications channel 116 can be any bus suitable for bidirectional communications. Communications channel 116 can be fixed, detachable, or wireless. Communications channel 116 can be, for example, a universal serial bus (USB), serial advanced technology (SATA) bus, or any other suitable bus.

Memory controller 106 can include one or more processors and/or microprocessors 120 that are configured to perform operations based on the execution of software and/or firmware instructions. Additionally and/or alternatively, memory controller 106 can include hardware-based components, such as ASICs, that are configured to perform various operations. Memory controller 106 can perform a variety of operations, such as executing commands issued by host 102.

Host controller 114 and memory controller 106, alone or in combination, can perform various memory management functions, such as garbage collection and wear leveling. In implementations where memory controller 106 is configured to perform at least some memory management functions, NVM package 104 can be termed "managed NVM" (or "managed NAND" for NAND flash memory). This can be in contrast to "raw NVM" (or "raw NAND" for NAND flash memory), in which host controller 114, external to NVM package 104, performs memory management functions for NVM package 104.

In some embodiments, memory controller 106 can be incorporated into the same package as memory dies 112*a-n*. In other embodiments, memory controller 106 may be physically located in a separate package or in the same package as host 102. In some embodiments, memory controller 106 may be omitted, and all memory management functions that are normally performed by memory controller 106 (e.g., garbage collection and wear leveling) can be performed by a host controller (e.g., host controller 114).

Memory controller 106 may include volatile memory 122. Volatile memory 122 can be any of a variety of volatile memory types, such as cache memory or RAM. Memory controller 106 can use volatile memory 122 to perform access requests and/or to temporarily store data that is being read from and/or written to NVMs 128*a-n* in memory dies 112*a-n*. For example, volatile memory 122 can store firmware and memory controller 106 can use the firmware to perform operations on NVM package 104 (e.g., read/program operations). Volatile memory 122 may also temporarily store health information associated with NVM in NVM package 104. Memory controller 106 can use NVM 128*a-n* to persistently store a variety of information, such as debug logs, instructions, and firmware that NVM package 104 uses to operate.

Memory controller 106 can use shared internal bus 126 to access NVMs 128*a-n*, which may be used for persistent data storage. Although only one shared internal bus 126 is depicted in NVM package 104, an NVM package can include more than one shared internal bus. Each internal bus can be connected to multiple (e.g., 2, 3, 4, 8, 32, etc.) memory dies as depicted with regard to memory dies 112*a-n*. Memory dies 112*a-n* can be physically arranged in a variety of configurations, including a stacked configuration, and may be, according to some embodiments, integrated circuit ("IC") dies.

NVMs 128*a-n* can be any of a variety of NVM, such as NAND flash memory based on floating gate or charge trapping technology, NOR flash memory, erasable programmable read only memory ("EPROM"), electrically erasable programmable read only memory ("EEPROM"), ferroelectric RAM ("FRAM"), magnetoresistive RAM ("MRAM"), phase change memory ("PCM"), or any combination thereof.

Figure 2:
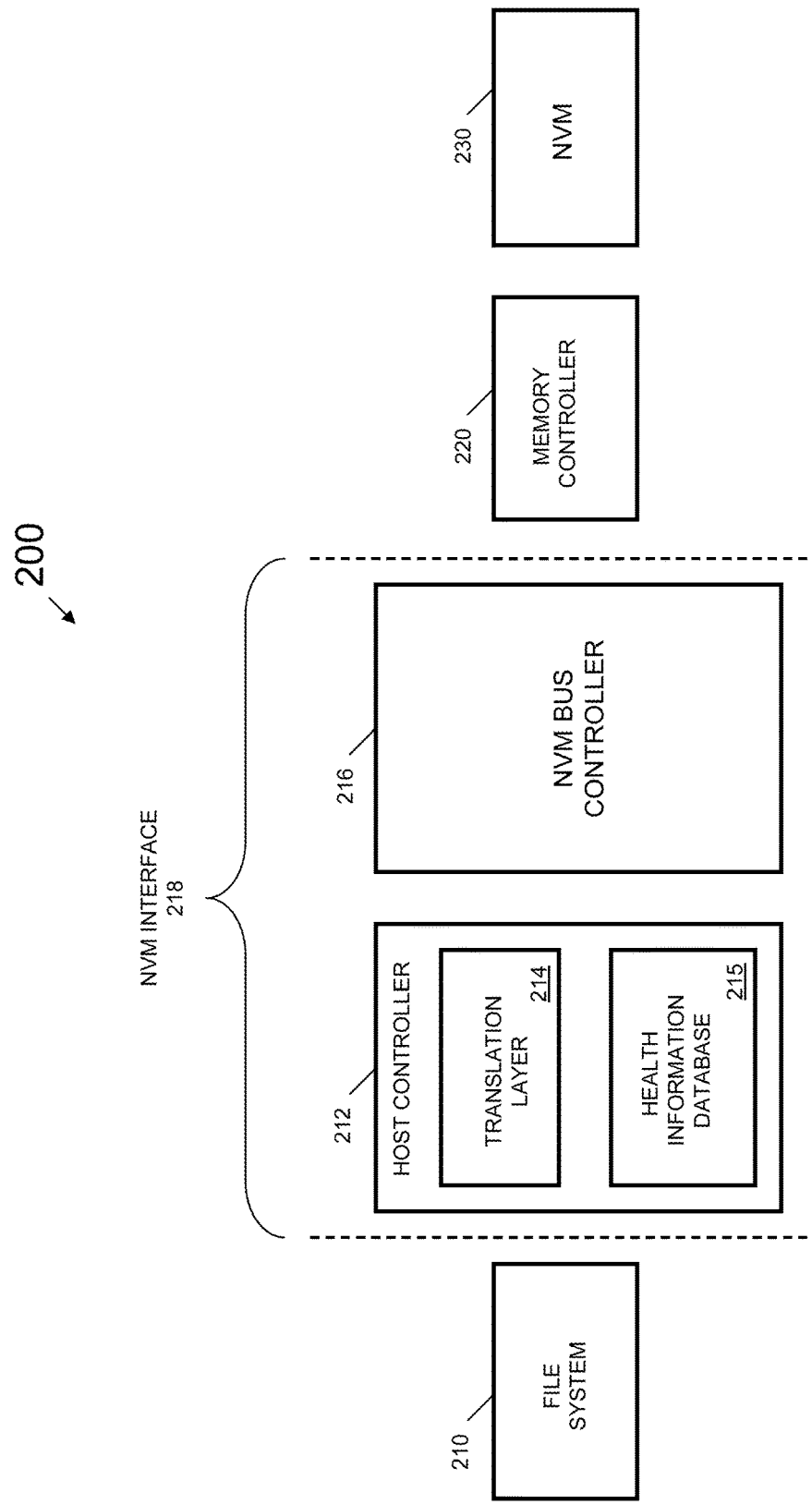
FIG. 2 is an illustrative system in accordance with various embodiments of the invention.

FIG. 2 illustrates a block diagram of electronic device 200, which may illustrate in greater detail some of the firmware, software, and/or hardware components of system 100 (FIG. 1) in accordance with various embodiments. Electronic device 200 may have any of the features and functionalities described above in connection with FIG. 1, and vice versa. As shown, dashed lines demarcate the layers. It is understood that the depiction of which components fall within the demarcation lines are merely illustrative and that one or more components can be affiliated with a different layer.

Electronic device 200 can include file system 210, host controller 212, NVM bus controller 216, memory controller 220, and NVM 230. In some embodiments, file system 210 and host controller 212 may be software or firmware modules, and NVM bus controller 216, memory controller 220, and NVM 230 may be hardware modules. Accordingly, in these embodiments, host controller 212 may represent the software or firmware aspect of NVM interface 218, and NVM bus controller 216 may represent the hardware aspect of NVM interface 218.

File system 210 can include any suitable type of file system, such as a File Allocation Table ("FAT") file system or a Hierarchical File System Plus ("HFS+"), and may be part of the operating system of electronic device 200 (e.g., part of SoC control circuitry 112 of FIG. 1). In some embodiments, file system 210 may include a flash file system, which provides a logical-to-physical mapping of pages. In these embodiments, file system 210 may perform some or all of the functionalities of host controller 212 discussed below, and therefore file system 210 and host controller 212 may or may not be separate modules.

File system 210 may manage file and folder structures for the application and operating system. File system 210 may operate under the control of an application or operating system running on electronic device 200, and may provide write and read commands to host controller 212 when the application or operating system requests that information be read from or stored in NVM 230. Along with each read or write command, file system 210 can provide a logical address to indicate where the user data should be read from or written to, such as a logical page address or a LBA with a page offset.

File system 210 may provide read and write requests to host controller 212 that are not directly compatible with NVM 230. For example, the logical addresses may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 218 can perform any functions that are memory-specific, vendor-specific, or both to handle file system requests and perform other management functions in a manner suitable for NVM 230.

Host controller 212 can include translation layer 214. In some embodiments, translation layer 214 may be or include a flash translation layer ("FTL"). On a write command, translation layer 214 can map the provided logical address to a free, erased physical location on NVM 230. On a read command, translation layer 214 can use the provided logical address to determine the physical address at which the requested data is stored. Because each NVM may have a different layout depending on the size or vendor of the NVM, this mapping operation may be memory and/or vendor-specific. Translation layer 214 can perform any other suitable functions in addition to logical-to-physical address mapping. For example, translation layer 214 can perform any of the other functions that may be typical of flash translation layers, such as garbage collection ("GC") and wear leveling.

For example, translation layer 214 can perform garbage collection to free up a programmed block of NVM 230 for erasing. Once freed and erased, the memory locations can be used to store new user data received from file system 210, for example. In some cases, the GC process may involve copying the valid data from the programmed block to another block having erased memory locations, thereby invalidating the valid data in the programmed block. Once all of the memory locations in the programmed block have been invalidated, translation layer 214 may direct NVM bus controller 216 to perform an erase operation on the programmed block. As used herein, "valid data" may refer to user data that has been programmed in response to the most recent write request corresponding to one or more logical addresses (e.g., LBAs), and may therefore be the valid version of user data for the one or more logical addresses.

Host controller 212 can include health database 215 for storing address specific health information. Health database 215 can include a lookup table of information corresponding to physical locations within NVM 230. When file system 210 sends a command and a logical address to host controller 212, translation layer 214 determines the physical location in NVM 230, and host controller 212 uses this physical location to obtain address specific health information from health database 215. In some embodiments, host controller 212 includes the health information obtained from health database 215 into a command packet that will be provided to memory controller 220. In this embodiment, host controller 212 serves as a data retrieval agent and does not use the health information to make any NVM management decisions. Host controller 212 can also serve as a data populating agent by updating health database 215 with health information received from memory controller 220.

Memory controller 220 generates the health information that is stored in health database 215. As a result, only memory controller 220 is able to interpret and use the health information. Though host controller 212 can store the health information in database 215, it is unable to use to in making NVM management decisions.

The information stored in health database (which can reside in volatile memory 108 of FIG. 1) can be information that enables software and/or hardware components downstream of NVM interface 218 or host interface 110 to more efficiently process a command request with respect to any specific physical location of NVM 230. For example, the health information can specify which error correction code should be implemented by the ECC engine resident on, for example, NVM package 104. As another example, the health information can store memory controller hardware settings such as program voltage, the number of program/verify cycles, and program resolution needed for a specific physical location within the NVM.

The health information can include any data that indicates the likelihood of degradation and/or fault of a portion of the NVM. In general, health information can encompass any data about an NVM that can be used to make decisions regarding its efficient and reliable use. By storing critical performance and calibration parameters, memory controller 106 or 220 can alter the manner in which it executes command requests to avoid unnecessary latency and data corruption.

In one particular example, health information may be used to pre-compensate a read operation initiated by the host. The host may initiate a read operation for a particular portion of the NVM (e.g., a block). The memory controller can receive the read operation and examine the health information associated with physical address (e.g., block or page) of the NVM. The health information may indicate that the last time that the block was read and that the read operation required more than one read cycle. For example, the read operation may have taken eight read cycles, where each read cycle employed progressively altered read conditions (e.g., progressively shifted threshold voltage values). Based on the health information, the memory controller can decide to use the last known successful read condition(s) to perform the requested read operation on the physical location. If the read operation is successful, the memory controller can return the health information about that physical location (e.g., block) back to the host unchanged. However, if the read operation required additional read cycles, the memory controller can update the health information about that physical location (e.g., block) and return the updated health information back to the host.

In another example, health information can be used to more effectively program a portion of the NVM when the host initiates a program operation. NVM (e.g., NAND flash memory) tends to degrade with time, use (e.g., the number of read/program cycles), and operating temperature. That degradation may manifest itself, for example, in a shift of the threshold voltage of memory cells. Therefore, health information can keep track of these critical parameters for portions of the NVM. When memory controller 106 receives a request from host 102 to program data to a particular portion of NVMs 128a-n, it can reference the health information associated with that portion of memory and determine how much and how quickly the programmed cells are likely to degrade. For example, if host 102 initiates a program operation for a portion of memory that is likely to degrade quickly (e.g., as indicated by the time, temperature, and cycle data in the health information) memory controller 106 may decide to alter the programming voltages to compensate for the expected threshold voltage drift.

Additional examples of health information that can be obtained and used according to some embodiments can include bit error rate data, which reflects the number of bad bits in a portion of NVM, DLL timing settings, and/or the time or number of cycles required to program or read data. Health information can also be compiled on page correctness, which can indicate the capacity of a memory device to correct for detected errors. For example, the number of Error Correction Code ("ECC") cycles required to correct errors or the ECC techniques used (e.g., High Bit Flip ECC, Low Bit Flip ECC, Software ECC, etc.) can indicate the health of a portion of NVM.

Host controller 212 may interface with NVM bus controller 216 to complete NVM access commands (e.g., program, read, and erase commands). NVM bus controller 216 may act as the hardware interface to memory controller 220, and can communicate with memory controller 220 using the bus protocol, data rate, and other specifications.

NVM interface 218 may manage NVM 230 based on memory management data, sometimes referred to herein as "metadata". The metadata may be generated by host controller 212 or may be generated by a module operating under the control of host controller 212. For example, metadata can include any information used for managing the mapping between logical and physical addresses, bad block management, wear leveling, error-correcting code ("ECC") data used for detecting or correcting data errors, or any combination thereof. The metadata may include data provided by file system 210 along with the user data, such as a logical address. Thus, in general, "metadata" may refer to any information about or relating to user data or used generally to manage the operation and memory locations of a non-volatile memory. In some embodiments, metadata and health information are mutually exclusive.

NVM interface 218 may be configured to store metadata in NVM 230. In some embodiments, NVM interface 218 may store metadata associated with user data at the same memory location (e.g., page) in which the user data is stored. For example, NVM interface 218 may store user data, the associated logical address, and ECC data for the user data at one or more memory locations of NVM 230. NVM interface 218 may also store other types of metadata about the user data in the same memory location.

NVM interface 218 may also store health information in NVM 230. NVM interface 218 can periodically store the contents of health database 215 in NVM 230, or it can store it during a power down event (e.g., when the device is turned off). If the health information is stored in NVM 230, it can be retrieved during power up to populate health database 215.

NVM interface 218 may store the logical address so that, on power-up of NVM 230 or during operation of NVM 230, electronic device 200 can determine what data resides at that location. In particular, because file system 210 may reference the user data according to its logical address and not its physical address, NVM interface 218 may store the user data and logical address together to maintain their association. This way, even if an index table in NVM 230 maintaining the physical-to-logical mapping becomes outdated, NVM interface 218 may still determine the proper mapping at power-up or reboot of electronic device 200, for example.

Figure 3:
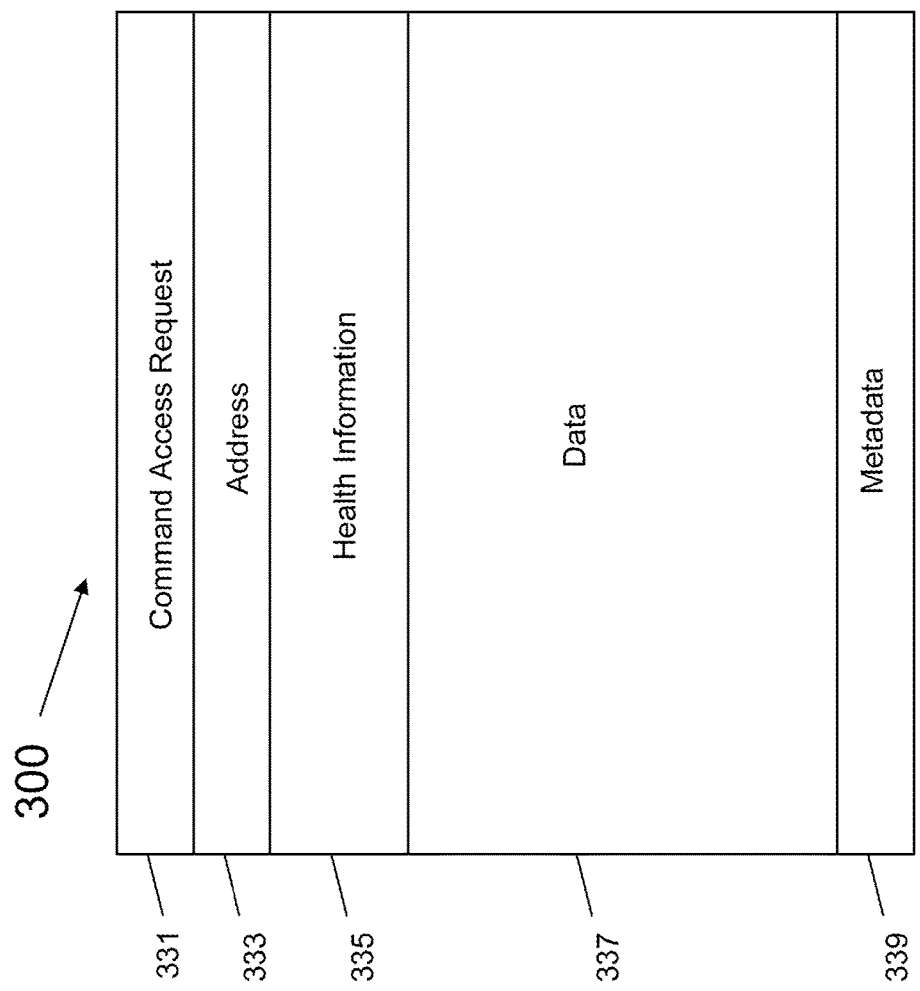
FIG. 3 is an illustrative data structure in accordance with various embodiments of the invention.

FIG. 3 is an illustrative diagram of command packet 300, which may be transferred between a host (e.g., host 102 of FIG. 1) device and a memory controller (e.g., memory controller 106 of FIG. 1). Command packet 300 can include command access request 331, address 333, health information 335, data 337, and metadata 339. Command access request 331 can be any suitable instruction provided by the host device to the memory controller such as, for example, a read, program, or erase request. Address 333 can be the physical address(es) within the NVM to be accessed. For example, the address(es) can be derived from the translation layer (e.g., translation layer 214).

Command packet can also include health information 335. Health information 335 can be associated to address 333, and thus may be referred to herein as address specific health information. The address specific health information may be retrieved from a health database (e.g., health database 215) by the host controller, which includes it in command packet 300. When command packet 300 is received by the memory controller, it can extract health information 335, process it, and execute command access request 331 accordingly. According to some embodiments, health information 335 can include address specific NVM health indicators, such as page correctness, threshold voltage, the time and/or number of cycles required to read, program, or erase that portion of NVM. In other embodiments, health information 335 can be a health grade, which may be a generalized health indication of the NVM calculated from individual NVM health indicators. Health information 335 may be specific to memory controller 220 and thus may only be interpreted and used by the memory controller. Thus, regardless of which manufacturer produces the memory controller and NVM, it can receive health information in command packet 300 that it can process and use. Moreover, the host controller is completely agnostic as to content of the health information.

Data structure 330 can also include data 337 and metadata 339. For example, when access request is a program request, data 337 can be the data being programmed to the NVM. Data 337 can be any suitable type of data. In embodiments in which the host device is a media player, data 337 can represent one or more media files (e.g., songs, videos, images, eBooks, etc.). Metadata 339 can include any information used for managing the mapping between logical and physical addresses, bad block management, wear leveling, error-correcting code ("ECC") data used for detecting or correcting data errors, or any combination thereof.

In an exemplary command program request, the memory controller can receive a program command packet from the host device over a communications channel (e.g., communications channel 116 of FIG. 1) in a first bus cycle and store it in a command register (e.g., in volatile memory 122). One or more bus cycles can then be used to input the address 333 into an address register in the volatile memory. Next, data 337 and metadata 339 can be loaded into a page buffer and then programmed into NVM at the address stored in the address register.

In an exemplary command read request, the memory controller can receive a command read packet from the host device over the communications channel in a first bus cycle and store it in the command register. One or more bus cycles can be used to input address 333 into an address register. Next, data stored in NVM at address 333 can be transferred to a page buffer and transferred to the host when the bus is ready.

Figure 4:
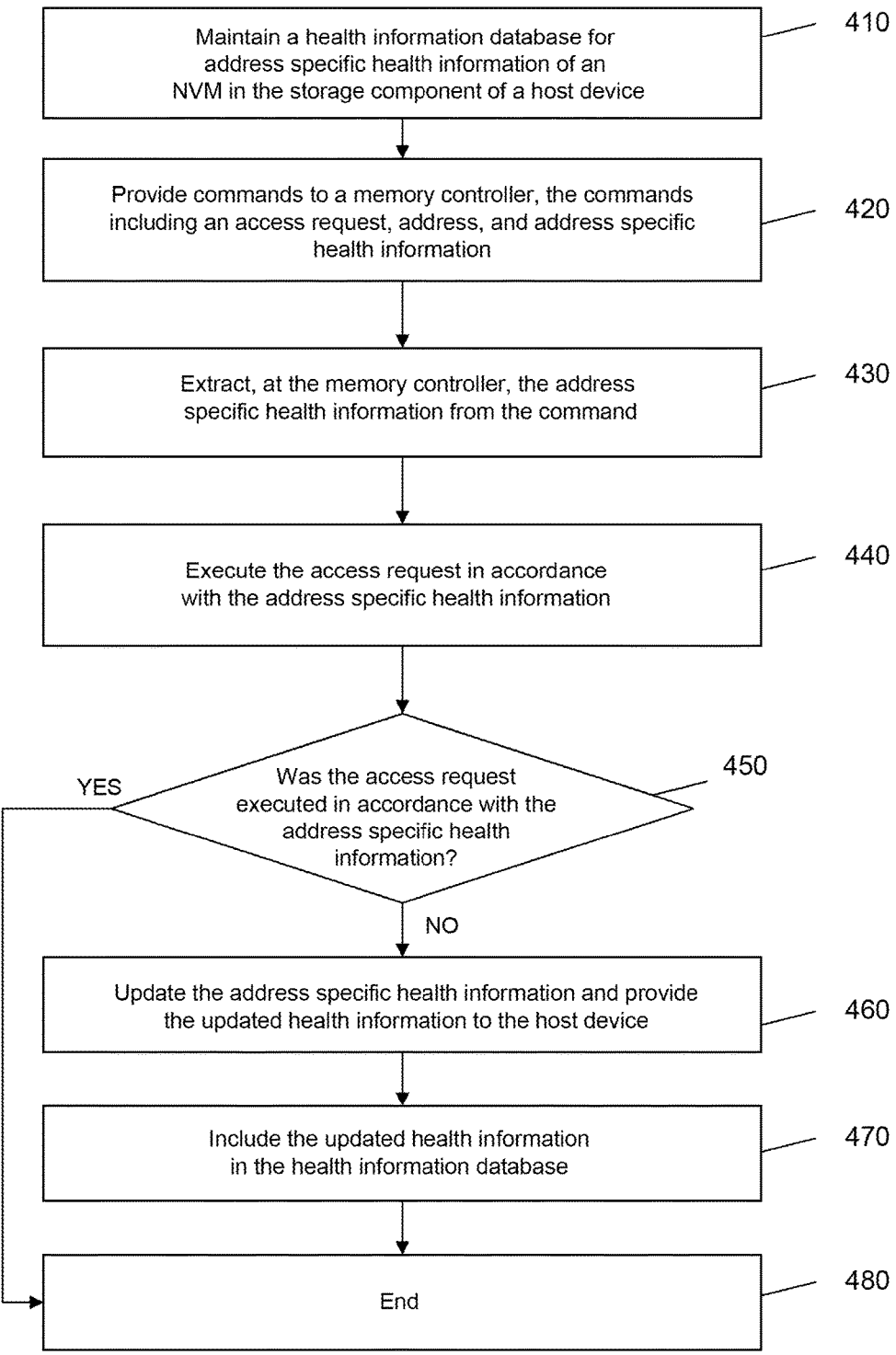
FIG. 4 is a flowchart depicting an illustrative process for obtaining and using health information in accordance with some embodiments of the invention.

FIG. 4 is an illustrative flowchart of steps of how a system uses health information in accordance with an embodiment of the invention. The system can include, among other things, a host device (e.g., host 102), a memory controller (memory controller 106), and NVM (e.g., NVM 128). At step 410, a health information database for NVM is maintained in at least one storage component. The at least one storage component can be volatile memory associated with the host device. The health information database stores physical address specific health information.

At step 420, commands are provided to a memory controller, and each command includes a command access request, address, and address specific health information. The host device can package the command by obtaining the physical address from a translation layer (e.g., translation layer 214) and use that physical address to retrieve address specific health information from the health information database. The command packet organized by the host can be similar to that discussed above in connection with FIG. 3.

At step 430, the memory controller can extract the address specific health information from the command. At step 440, the memory controller can execute the access request in accordance with the address specific health information. For example, the memory controller takes whatever hardware and/or software parameters present in address specific health information into account when executing the command with respect to the physical address of the NVM. If a program command is being executed, the health information may specify how finely tuned the programming should be or specify the program time, or what the final program voltage level should be for a given location. Using this information, the controller can program the data in a manner best suited for its intended location.

At step 450, a determination is made whether the access request was executed in accordance with the address specific health information. If the access request was executed in accordance with the address specific health information, then the process ends at step 480. If the access request was not executed in accordance with the address specific health information, the process proceeds to step 460. The process may proceed to step 460, for example, if a different software and/or hardware parameter was needed to execute the access request than that included with the address specific health information. For example, the memory controller can compare the actual parameter used against what the health information suggested the parameter should be.

At step 460, the memory controller can update the health information by packaging the changed parameter(s) into a packet and provide it to the host device. The packet can include the address and updated health information. At step 470, the host device can update the health information in the health information database using the changed parameter(s) received from the memory controller.

It is to be understood that the steps shown in FIG. 4 are merely illustrative and that existing steps may be modified or omitted, additional steps may be added, and the order of certain steps may be altered.

While there have been described systems and methods for obtaining and using nonvolatile memory health information, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements.

The described embodiments of the invention are presented for the purpose of illustration and not of limitation.

What is claimed is:

1. A system comprising:
non-volatile memory ("NVM");
a memory controller communicatively coupled to the NVM over a first bus; and
a host controller including at least one storage component, wherein the host controller is communicatively coupled to the memory controller over a second bus, and wherein the host controller is configured to:
maintain a health information database for the NVM in the at least one storage component, wherein the health information database includes address-specific health information, and wherein the address-specific health information includes data indicative of a number of read cycles previously performed on a portion of the NVM during a previous read operation at a corresponding address;
receive, from a file system, a memory request that includes a logical address;
translate the logical address to a physical address in the NVM; and
provide a command to the memory controller over the second bus, wherein the command includes an access request, the physical address, and address-specific health information related to the physical address;
wherein, to reduce a latency in completing execution of the command, the memory controller is configured to:
receive, from the host controller, the command, including the address-specific health information related to the physical address;
extract, from the command, the address-specific health information, including the data indicative of the number of read cycles; and
execute the access request by altering the access request using the data indicative of the number of read cycles included in the address-specific health information.

2. The system of claim 1, wherein the NVM comprises NAND flash memory.

3. The system of claim 1, wherein the memory controller is further configured to:
update the address-specific health information; and
provide the updated address-specific health information to the host controller.

4. The system of claim 3, wherein the host controller is further configured to store the updated address-specific health information in the health information database.

5. The system of claim 1, wherein the host controller is further configured to operate independent of any address-specific health information stored in the health information database.

6. The system of claim 1, wherein the host controller is prevented from independently modifying any address-specific health information in the health information database.

7. The system of claim 1, wherein the address-specific health information includes error correction parameters, program parameters, or read parameters.

8. The system of claim 1, wherein the host controller is further configured to:
  utilize a lookup table to access the health information database to retrieve respective address-specific health information for the physical address; and
  incorporate the respective address-specific health information and the physical address into the command provided to the memory controller.

9. A method, implemented by a system including a host controller and a memory controller that communicates with non-volatile memory ("NVM"), the method comprising:
  maintaining, by the host controller, a health information database for the NVM, wherein the health information database includes address-specific health information, and wherein the address-specific health information includes data indicative of a number of read cycles previously performed on a portion of the NVM during a previous read operation at a corresponding address;
  receiving, by the host controller from a file system, a memory request that includes a logical address;
  translating the logical address to a physical address in the non-volatile memory;
  providing a command to the memory controller, the command including an access request, the physical address, and address-specific health information related to the physical address;
  receiving, by the memory controller from the host controller, the command including the address-specific health information corresponding to the physical address; and
  reducing, by the memory controller, a latency in completing execution of the command by:
    processing the address-specific health information extracted from the command to obtain the data indicative of the number of read cycles; and
    executing the access request by altering the access request using the data indicative of the number of read cycles included in the address-specific health information.

10. The method of claim 9, further comprising:
  determining whether a change occurred in the data indicative of the number of read cycles while executing the access request;
  updating the address-specific health information to include the change in the data indicative of the number of read cycles in response to a determination that a change occurred; and
  transmitting the updated address-specific health information and the physical address to the host controller.

11. The method of claim 9, wherein the address-specific health information includes an error correction code ("ECC") parameter.

12. The method of claim 9, wherein the address-specific health information includes a read parameter.

13. The method of claim 9, wherein the address-specific health information includes a program parameter.

14. The method of claim 9, wherein the access request is a read request or a program request.

15. A non-volatile memory package comprising:
  non-volatile memory ("NVM");
  an interface for communicating with a host, wherein the host stores a health information database for the NVM, wherein the health information database includes address-specific health information; and
  a controller coupled to the interface and the NVM, wherein to reduce a latency in completing execution of a command, the controller is configured to:
    receive the command from the host, via the interface, wherein the command includes an access request, a physical address in the NVM, and address-specific health information from the health information database, and wherein the address-specific health information includes data indicative of a number of read cycles previously performed on a portion of the NVM during a previous read operation at a corresponding address;
    process the address-specific health information extracted from the command to obtain the data indicative of the number of read cycles; and
    execute the access request by altering the access request using the data indicative of the number of read cycles included in the address-specific health information.

16. The NVM package of claim 15, wherein the controller is further configured to:
  determine whether a change occurred in the data indicative of the number of read cycles while executing the access request;
  update the address-specific health information to include the change in the data indicative of the number of read cycles in response to a determination that a change occurred; and
  transmit the updated address-specific health information and the physical address to the interface.

17. The NVM package of claim 15, wherein the a address-specific health information includes an error correction code ("ECC") parameter.

18. The NVM package of claim 15, wherein the address-specific health information includes a read parameter.

19. The NVM package of claim 15, wherein the a address-specific health information includes a program parameter.

20. The NVM package of claim 17, further comprising an error correction code ("ECC") engine coupled to the controller, wherein the controller instructs the ECC engine to use the ECC parameter.

* * * * *